May 2, 1933. E. F. KINGSBURY 1,906,973
PHOTOGRAPHIC COPYING SYSTEM
Filed May 25, 1929

INVENTOR
E. F. KINGSBURY
BY C. A. Sprague.
ATTORNEY

Patented May 2, 1933

1,906,973

UNITED STATES PATENT OFFICE

EDWIN F. KINGSBURY, OF RUTHERFORD, NEW JERSEY, ASSIGNOR TO BELL TELEPHONE LABORATORIES, INCORPORATED, OF NEW YORK, N. Y., A CORPORATION OF NEW YORK

PHOTOGRAPHIC COPYING SYSTEM

Application filed May 25, 1929. Serial No. 365,815.

This invention relates to photographic copying and more particularly to copying in the process of electrically producing pictures, images and the like of distant objects.

An object of the invention is to correct in the copying operation for defects of tone or shape, or both, a picture to be copied.

Another object of this invention is to correct transmitted pictures for errors in sending or in reception.

A further object of the invention is to overcome the error of angular or skew distortion of the various parts of the picture, such as might arise due to lack of synchronism between the sending and the receiving stations.

A further object of the invention is the correction of the intensity of the picture so that the final picture will have the same lighting intensity or line level values throughout the entire picture.

Other objects and advantages will appear from a consideration of the specification in connection with the accompanying drawing.

The invention pertains more particularly to image producing systems in which the object is analyzed and built up by a progressive line scanning operation. In such a system a lack of synchronism between the sending and receiving instruments will cause an appreciable angular distortion or skewing effect in the received record or picture, in that some or all of adjacent elements or scanning lines may be offset relatively to one another.

Variations in the lighting at either end in such a system may cause additional defects in the received picture or image by producing false changes in film density known as level errors. This is particularly noticeable when a narrow strip of fixed or constant light level or value, such as a ruled margin line, extends across the whole range of scanning lines and this invention is intended to make use of the existence of such a line for correcting for inaccuracies in level.

A suggested structure to be employed in the steps contemplated in this invention includes a focal plane shutter or screen associated with a holder or frame, carrying the originally received film. These two members may be so connected or related to one another that movement of the shutter will give any particular desired movement to the holder frame. For instance, an adjustable or adjustably positioned cam surface on the film holder or shutter screen may engage with a wheel on the other member, the wheel being situated to rest on the cam surface and to be moved along the surface as the shutter is moved. The wheel in following the cam track will give any desired cross movement to the film holder, the characteristics of the movement being prearranged to offset the distortion due to the lack of synchronism between the sending and receiving stations. This apertured or slotted screen used as a focal plane shutter is placed between a source of light and a copying camera, the latter being focussed on the film mounted on the holder. The shutter may be slowly drawn across the field of view of the copying camera and an adjustable aperture thereof will expose elemental strips of the defective film. The simultaneous movement of the film holder and the shutter as prearranged will correct the skew distortion.

Correction for tone value errors may be made in the same process or step using a special aperture in the focal plane shutter possibly positioned slightly in advance of the aperture that scans the film for copying purposes. A light sensitive cell receives light rays from a marginal portion of the film where the light value should be constant and will vary a current therethrough when any change in light level occurs. Any suitable arrangement may be provided such, for example, as an arrangement to change the resistance in the lamp circuit used for lighting the film to vary the degree of illumination, or a connection to a light valve such as the iris of the copying camera or to a vane moving in the rays of light to change the intensity of light directed upon the sensitive film in the camera. The application of this light correction step may be independent of skew correction, being applicable even where no need exists for correction of angular distortion.

The invention will now be described more in detail having reference to the accompanying drawing.

Identical elements in the several figures are identified by like reference characters.

Figure 1:
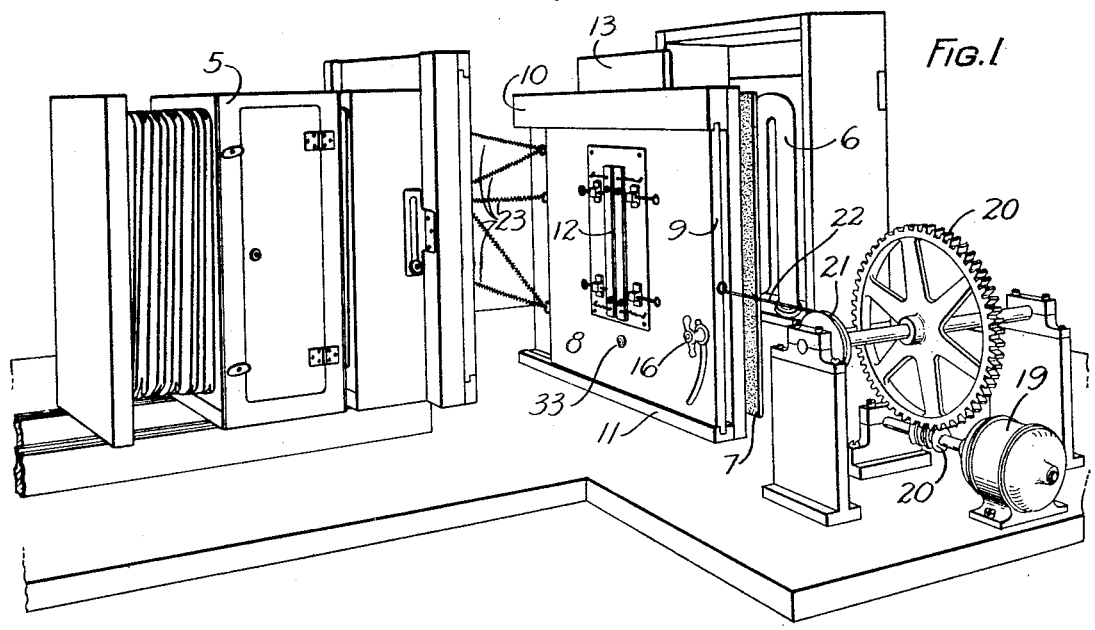
Fig. 1 is a perspective of one embodiment illustrative of the invention.

Referring now to Fig. 1, a modified form of photographic copying apparatus comprises a copying camera 5, a mercury vapor light source 6 for illuminating a ground glass plate 7 between which and the copying camera is a correction board 8 containing a skewed picture in the focus of the camera.

As hereinbefore briefly explained such a skewed picture will be obtained in an electrical picture transmission system if there is lack of synchronism between the transmitting and recording apparatus, for example, if there is lack of synchronism between the transmitting and receiving drums in a system such as that disclosed in Patent No. 1,606,227, issued November 9, 1926 to Messrs. Horton, Ives and Long. Ordinarily, the skew occurs due to a longitudinal shift of adjacent elemental lines by a constant amount from line to line. The correction board of Fig. 1 is arranged to correct for such distortion. Instead of exposing the entire copy simultaneously, a narrow aperture is moved uniformly sidewise over the face of the film in a direction perpendicular to the elemental lines at the same time that the distorted film is moved in the direction of the elemental lines so as to always bring one edge of any elemental line of the picture to exactly the same point in the exposing aperture. The resultant print will then be contained in a rectangle. Such an exposure may be obtained by the use of the correction board 8.

A member 9 slidable horizontally in the rigidly supported guide members 10 and 11 carries the slit aperture 12. Vertical slide 13, on which the skewed picture is placed, is slidable between rigidly secured vertical guides 35, shown in Fig. 2 and is supported on a cam carried by the member 9.

Figure 2A:
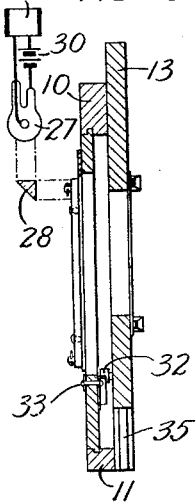
Figs. 2a and 3 illustrate modifications of Fig. 1.
Figure 2:
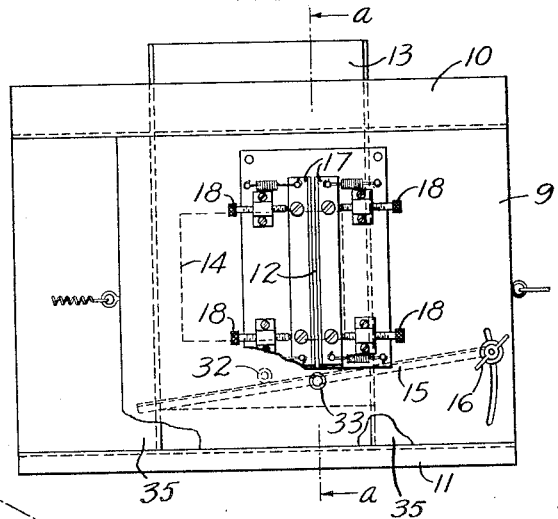
Fig. 2 shows details of Fig. 1.

The details of the correction board are shown more clearly in Figs. 2 and 2a. A rectangular opening outlined by the dotted rectangle 14 is cut in the center of the slide 13 over which the distorted picture is placed. A wheel 32 mounted on the slide 13 rests on an adjustable cam 15 pivoted at 33 which may be held in a selected position by the clamping nut 16. The separation between the slit forming members 17 and thus the width of the slit aperture may be adjusted by adjusting screws 18.

The member 9 may be moved horizontally by the motor 19 operating through gears 20, drum 21 and fine wire 22. Springs 23 oppose the pull of the fine wire 22 to insure a steady motion in both directions. As the member 9 moves, for example, to the right the slide 13 moves downward with respect to the aperture 12. By suitably adjusting the cam 15 the relative motion between the aperture 12 and the skewed film can be such that corresponding points of each of the elemental lines of the picture coincide with a fixed point of the aperture 12, thereby correcting for the skew of the picture being copied.

Figure 4:
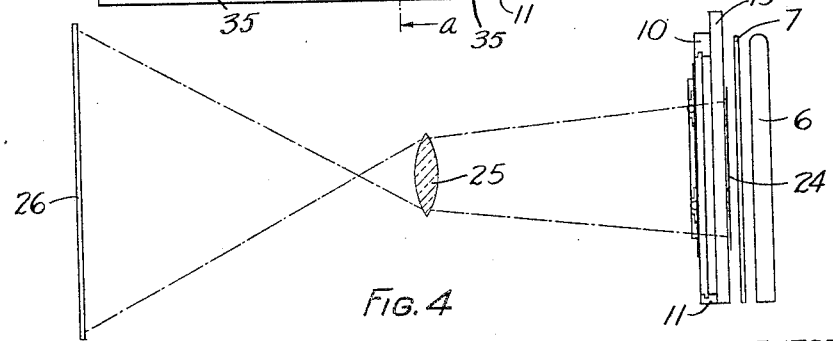
Fig. 4 shows the optical system of Fig. 1 partially in cross-section.

In Fig. 4 which shows more in detail the optical system of Fig. 1, the picture 24 to be copied is focussed by the lens 25 of the copying camera upon the film or plate 26.

Figure 3:
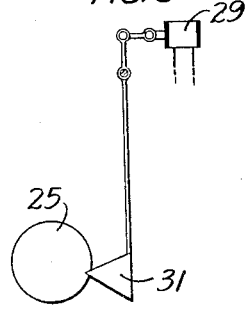

In the transmission of pictures electrically, the transmission equivalent of the circuit may change during the period of transmission so that the light intensities of the reproduced picture do not correspond to those of the originating picture. There are various reasons for this among which may be mentioned variations in light intensity of the scanning light at the transmitter or the receiver, voltage changes in the current sources in the transmitting and receiving equipments or repeaters and changes in the electrical characteristics of the transmission lines or channels. Errors thus introduced may be corrected according to this invention. In the preferred arrangement a narrow strip across the elemental lines is adapted to be exposed uniformly unless changes occur in the transmission equivalent of the circuit. To correct for changes should they occur the copying equipment hereinbefore described is modified by providing a photoelectric cell 27 to receive light from this narrow strip of the film. The light is directed to the cell 27 by the totally reflecting prism 28 as shown in Fig. 2a. The photoelectric cell 27 is electrically connected with the relay 29 through battery 30. The energization of relay 29 controls the moving vane 31 shown in Fig. 3, and so the aperture of lens 25 and thus the exposure of the plate or film 26. The reflecting prism 28 and the photoelectric cell 27 are rigidly mounted by any suitable means upon the board 9 in front of the aperture 12 and outside of the path of the picture forming light rays projected through the aperture 12. The prism 28 and cell 27 would thus receive at all times during movement of the light slit 12 light projected from the narrow strip of the picture through a small section of the slit 12. The relay 29 and moving light vane 31 may be mounted on the front of the copying camera 5 in any suitable manner so that the vane 31 is free to move across the front of the lens 25. If there has been no change in the transmission equivalent of the circuit during the exposure of a given film, the density of the narrow strip will be constant and the current in the photoelectric cell 27 and relay 29 will likewise be constant to maintain the aperture of lens 25 constant. If changes have occurred, however, corresponding changes will occur in the density of the narrow strip, the current in the cell 27 and the relay 29, and the aperture of lens 25. The arrangement is such that the change in aperture corrects for the changes in transmission level so that the tone values of the copied picture corresponds to those of the original picture.

The light incident upon the photoelectric cell 27 and the current produced therein may be used in other ways to control the exposure of the copying surface. The arrangement for correcting for varying transmission levels may be used independently of the skew correcting apparatus.

It is not necessary to illuminate the whole surface of the picture being copied. A movable light directly back of the slit aperture and moving therewith may be used. This arrangement may give greater efficiency and more uniformity of illumination. It is also possible to make the exposure more uniform by controlling the lamp and motor currents in such a way that a change in one results in a compensating change in the other. Thus the use of a common source of potential is advantageous since if this voltage drops, for example, both the lamp current and the motor speed will decrease and the illumination will decrease as the duration of the exposure increases.

The principle used in the hereinbefore described method of correcting the skew can also be applied to the sensitive photographic plate or film upon which the copy is being made as the sensitive surface can be displaced laterally at the required proportionate rate to a focal plane shutter moving over its surface and accomplish exactly the same correction of the skewed film. It is obvious that combinations of the two methods can also be used such as moving the skewed film at a rate proportionate to the velocity of a focal plane shutter in the copying camera or displacing the sensitive surface while a shutter moves across the skewed film.

It is to be understood that various other modifications of the specific systems disclosed come within the purview of this invention, the scope of which is defined in the appended claims.

What is claimed is:

1. The method of correcting a skewed picture comprising the steps of mounting a defective film of the picture in a holder adapted for movement, focussing a camera on said film, moving an apertured shutter between said film and a sensitive surface in the camera, and moving the film holder vertically and shutter transversely with respect to the camera in a manner so that the aperture exposes to the sensitive surface in said camera minute elemental areas of said picture in positions located in proper relationship to one another.

2. The method of correcting a skewed picture comprising the steps of mounting the film in a holder adapted for movement in one direction, focussing a camera having a sensitive surface on said film, placing a shutter between said film and camera, said shutter being slotted in the direction of movement of said film, and copying on the sensitive surface in said camera the film while moving the shutter and moving the film holder in a predetermined manner relative to the shutter so that the slotted aperture exposes to said sensitive surface narrow elemental strips of said picture in positions located in proper relationship to one another.

3. An apparatus for use in correcting defective pictures including a film having a control record formed thereon, a holder for said film, a slotted screen mounted adjacent said holder and adapted on movement to progressively expose the film, and light sensitive means suitably positioned relative to said slot to receive light transmitted progressively from said control record of said film, and arranged to regulate the intensity of light transmitted from said film in accordance with the varying tone values of said control record.

4. An apparatus for use in correcting defective pictures including a film holder, a slotted screen mounted adjacent said holder and adapted on movement to progressively expose the film, a cam surface adjustably positioned on said screen, and a wheel on said film holder adapted to engage the cam surface and move therealong.

5. An apparatus for use in correcting defective pictures, comprising a film holder, a shutter with a fixed aperture adapted on movement to expose each elemental area of the defective picture and a control record formed thereon to an equal amount of light, and light sensitive means for controlling the intensity of the light between the defective picture and the corrected picture in accordance with the tone values of said control record.

6. The method of correcting a defective picture comprising rephotographing the picture by exposing each elemental portion of said picture and a control record formed thereon to the same amount of light, and controlling by light sensitive means the intensity of the light after its transmission through the defective picture in accordance with the tone values of said control record.

7. The method of correcting a defective picture comprising rephotographing the picture by exposing each elemental area of said picture and a control record formed thereon to the same amount of light, and controlling the intensity of the light after its transmission through the defective picture by an elemental area of said control record being exposed at that instant.

8. An apparatus for use in correcting skew and tone level defects in pictures including a picture holder having a defective picture mounted thereon and adapted for movement in one direction, a copying camera focused on said defective picture, a shutter with a fixed aperture interposed between said defective picture and copying camera adapted to progressively expose elemental areas of said defective picture, and light sensitive means adapted for controlling the intensity of the exposure light between said defective picture and copying camera in accordance with light transmitted by a predetermined portion of said defective picture.

9. The method of correcting a defective picture having a control record which comprises rephotographing the picture by exposing a single element of the picture and control record at a time in accordance with the tone values of said single element of said record, and controlling the intensity of the light transmitted to the sensitive surface in the copying camera from element to element.

10. The method of correcting a defective picture having a control record which comprises rephotographing the picture by exposing a single element of the picture and control record at a time, and varying in accordance with the tone values of said single element of said record the instantaneous intensity of the light transmitted to the sensitive surface in the copying camera.

11. The method of correcting a defective picture having a control record which comprises progressively exposing elements of the picture and control record by means of a moving narrow aperture, moving the picture lengthwise with respect to the aperture, continuously exposing a sensitive surface in a camera to light transmitted through said picture, and varying the intensity of said light in accordance with the varying tone values of said control record.

12. A copying camera for changing the appearance of the picture in the copying process comprising means to expose elemental portions of the copy and a control record printed thereon successively, means to image the exposed portions of the copy on a record blank, and means to control the intensity of the light incident upon the record blank for each exposed elemental portion of the copy in accordance with the varying tone value of said control record to effect the desired change in the appearance of the copied picture.

13. The method of correcting a defective picture having a control record, comprising progressively exposing elements of the picture and control record by means of a moving narrow aperture, moving the picture lengthwise with respect to the aperture, continuously exposing a sensitive surface in a camera to light transmitted through said picture, and varying the intensity of said transmitted light between said picture and camera in accordance with the varying light transmitted through said control record.

In witness whereof, I hereunto subscribe my name, this 23d day of May, 1929.

EDWIN F. KINGSBURY.